Oct. 27, 1959      F. M. FIKE      2,910,108

LEAF SPRING RE-ARCHING TOOL

Filed Nov. 15, 1957

INVENTOR.
FLOYD M. FIKE,
BY
McMorrow, Berman & Davidson
ATTORNEYS.

United States Patent Office 2,910,108
Patented Oct. 27, 1959

2,910,108
LEAF SPRING RE-ARCHING TOOL
Floyd M. Fike, Perryton, Tex.

Application November 15, 1957, Serial No. 696,749

4 Claims. (Cl. 153—38)

In automobile or truck maintenance and repair operations, it is often necessary to perform conditioning operations on the leaf springs. In many instances, one of the rear springs will sag, and it is desirable, in these circumstances, to re-arch the spring, so that both springs will be identical in respect to the arch thereof.

This is of importance, for example, in wheel alignment operations. In actuality, those concerned with this phase of automobile maintenance are in substantial agreement that proper wheel alignment necessitates leveling of the vehicle at the rear thereof. Obviously, this in turn requires conditioning of the rear leaf springs, so that neither rear spring sags in respect to the other. Front wheels of an automobile should not be aligned, it is generally agreed, if one rear wheel spring has sagged to an extent over one-half inch below the other rear spring.

Obviously, in some circumstances the entire rear spring should be replaced; however, it has been found that it is very often possible to re-arch a spring, it being further possible in many situations to fully service the springs in this manner without requiring replacement of any of the leaves. In other instances, the replacement of a leaf may be required.

One important object of the present invention is to provide a spring re-arching tool which will be particularly designed to permit re-arching of a rear spring without the necessity of removal of the spring from the vehicle.

Another object is to provide a tool as described which will be particularly designed to effect speedy and accurate re-arching of a spring, the tool having been found in practice to permit re-arching of a spring in a comparatively few minutes. This in turn eliminates excessive periods of time during which a vehicle occupies space within a garage, it being well known that spring removal service as heretofore practiced often takes several hours. This of course has the further disadvantage of inconveniencing the customers. It is proposed in carrying out the invention to eliminate all these difficulties which have heretofore persisted.

A further object of importance is to permit the re-arching operation to be carried out with a particularly high degree of accuracy. To this end, the tool is specially calibrated, so that the user will know exactly the amount of pressure being applied to the spring. This in turn permits the same amount of pressure to be used at both ends of a single spring, and in addition permits separate springs of a single vehicle to be conditioned by identical amounts of pressure.

Still another object is to provide a tool as stated which will be particularly designed to service wide leaf springs such as are found on late model vehicles.

A further object of importance is to effect the re-arching of the spring in such a manner that the arch imparted to the spring by the tool will remain in the spring without undesirable flattening out or loss of the selected arch.

Other objects will appear from the following description, the claims appended thereto, and from the annexed drawing, in which like reference characters designate like parts throughout the several views, and wherein:

Figure 1:
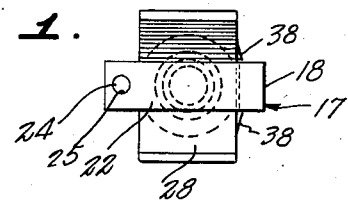
Figure 1 is a top plan view of a spring re-arching tool according to the present invention.
Figure 2:
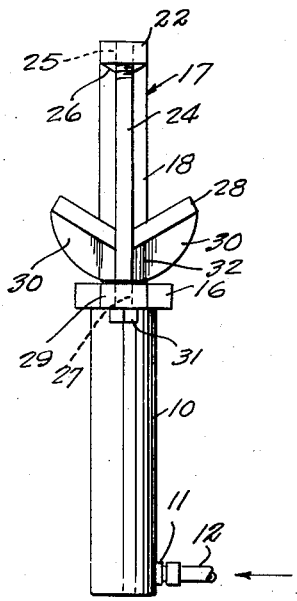
Figure 2 is a front elevational view thereof.

Referring to the drawing in detail, the reference numeral 10 designates an elongated, straight cylinder, having an outer end to which is connected a fitting 11, having connected thereto a hose or tube leading from a source of hydraulic fluid under pressure, not shown.

Cylinder 10 has an inner end externally threaded as at 14, to which is connected a correspondingly internally threaded ring 16 constituting an inner leg of a C-shaped fixed jaw generally designated 17, that includes also a bight portion 18 having calibrations 20, and an outer leg 22 perpendicular to the bight portion and extending in parallel relation to the inner leg 16.

A retaining bolt or pin 24 at one end is threaded for engagement in a correspondingly threaded opening 25 of leg 22. The other end of the bolt extends through a smooth-walled opening 27 formed in a radial projection 29 integral with ring 16 and constituting, with the ring, the inner leg of the fixed jaw. The head of the bolt, designated 31, bears against the underside of the extension or projection 29.

Integrally formed upon the inner surface of the leg 22 is a rib 26, of inverted isosceles triangular cross section, this arrangement forming a contact point 33 on the rib which is adapted to bear against the spring S that is being re-arched.

Figure 4:
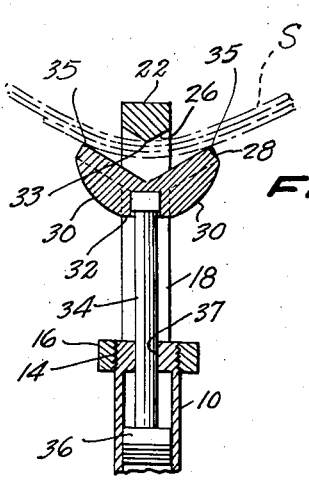
Figure 4 is a longitudinal sectional view through the tool substantially on line 4—4 of Figure 3 in which the movable jaw has been shifted to operative position, a spring that is being re-arched being shown fragmentarily and in dotted lines.

Rib 26 is in confronting relation to a complementarily shaped movable jaw 28 having a shallowly V-shaped cross sectional configuration, as shown in Figure 4 to best advantage, so that it bears only at its opposite side edges 35 against the spring S, at locations equidistantly spaced from the contact point 33.

The movable jaws are reinforced by gussets 30 formed integrally with the opposite side portions of the jaw and extending radially outwardly from a boss 32 that is disposed at the midwidth portion of the movable jaw. Boss 32 has a recess in which is engaged a stem or rod 34 axially slidable in a center opening 37 of the inner end of the cylinder 10. Within the cylinder, the stem 34 is connected to a piston 36.

Figure 3:
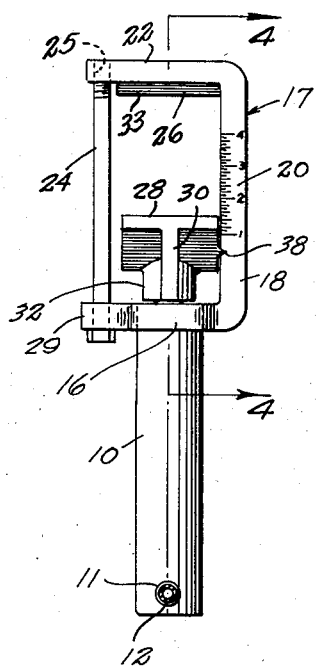
Figure 3 is a side elevational view of the tool as seen from the right of Figure 2.

To hold the movable jaw against rotational movement from its assigned position, the respective side portions of the movable jaw have small lugs 38 (Figures 1 and 3) slidably contacting opposite side surfaces of the bight portion 18. In addition, the lugs 38 constitute index arms or pointers registrable with a selected calibration of the calibrations 20. The calibrations 20 would of course be in both side surfaces of the bight portion to permit inspection of the same from either side of the tool.

The calibrations can of course be of any desired type, according to the desires of the particular manufacturer but regardless of the kind of calibrations selected for use, in every instance they will of course indicate the extent of pressure being applied to the spring S at a particular point.

In use, the bolt 24 is removed, so as to open the jaw at one side, after which the tool is positioned to receive the spring S.

With the spring now disposed between the fixed and movable jaws, in the space between rib 26 and movable jaw 28, the bolt is returned, so as to hold the tool against accidental slippage laterally off the spring. Now hydraulic pressure is applied to extend the rod 34. As the movable jaw moves toward rib 26, the spring is re-arched to a selected extent, with the extent of the arching being governed by the extent to which the movable jaw is moved toward the rib 26. This of course is selected by application of hydraulic pressure, to such an extent to locate the pointer 38 in registration with a selected one of the calibrations 20.

Ordinarily, in re-arching a leaf-type spring of a passenger car or light truck (the tool is particularly designed for but is not restricted to use on vehicles falling within either of these general categories) one would ordinarily start at the end of the spring, either the front or the rear end, that shows the greaest amount of sag. Pressure is usually applied a two or three points at either end of the spring, moving the tool toward the midlength point of the spring. Ordinarily, one would not attempt to make all the correction at one location, and would follow such cautions as are observed when using, for example, a spindle support correcting tool. The calibrations 20 and pointers 38 of course permit accurate determination of the amount of correction being made. Most usually, all that would be necessary would be to re-arch the ends of the first and second leaves. However, the third leaf may be considered also to sufficiently raise and level the rear of the vehicle.

In addition, the tool is designed for use with hydraulic means that are conventional per se. For example, the cylinder 10, tube 12, rod 34 and cylinder 36 may comprise a conventional hydraulic ram or jack, with the threads of the ring 16 being designed to accommodate said conventional jack.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a spring re-arching tool, a hydraulic cylinder; a piston working in said cylinder; a rod rigid with the piston and projecting beyond one end of the cylinder; a movable jaw mounted upon said rod; a C-shaped, fixed jaw fixedly connected at one end to the cylinder, the other end of the fixed jaw including a rib in confronting relation to the movable jaw, for engagement of a spring between the rib and movable jaw, said rib having a single line of contact with the spring, the movable jaw having two lines of contact with the spring equidistantly spaced from the first named line of contact; and pointer means carried by the movable jaw, the fixed jaw having a series of calibrations traversed by the pointer means on movement of the movable jaw toward and away from said rib, said fixed jaw including a removable connecting bolt extending between the opposite ends of the fixed jaw for holding the tool assembled with a spring that is being re-arched.

2. In a tool for re-arching the leaf spring of an automotive vehicle, a C-shaped fixed jaw including a bight portion and legs extending from and rigid with the bight portion at the respective ends of the bight portion, one of said legs being formed with a longitudinal, narrow, elongated rib of inverted-isosceles-triangular cross-section extending at one end fully to the intersection of said one leg with the bight portion, the bight portion having a longitudinal series of calibrations; a movable jaw having a shallowly V-shaped cross-section, said movable jaw being aligned with and opening toward the rib, said movable jaw being of a width greater than that of the rib and being symmetrically disposed with respect thereto so as to dispose the opposite side edges of the movable jaw laterally outwardly from and in equidistant relation to the respective sides of the rib, the movable jaw extending at one end fully to the bight portion in slidable engagement therewith and having an index marking at said one end thereof traversing said series on advancement of the movable jaw toward the fixed jaw; means for advancing the movable jaw toward the fixed jaw, carried by the other leg; and a removable connecting bolt extending between the legs parallel to the bight portion in closely spaced relation to the other ends of the rib and movable jaw.

3. In a tool for re-arching the leaf spring of an automotive vehicle, a C-shaped fixed jaw including a bight portion and legs extending from and rigid with the bight portion at the respective ends of the bight portion, one of said legs being formed with a longitudinal, narrow, elongated rib of inverted-isosceles-triangular cross-section extending at one end fully to the intersection of said one leg with the bight portion, the bight portion having a longitudinal series of calibrations; a movable jaw having a shallowly V-shaped cross-section, said movable jaw being aligned with and opening toward the rib, said movable jaw being of a width greater than that of the rib and being symmetrically disposed with respect thereto so as to dispose the opposite side edges of the movable jaw laterally outwardly from and in equidistant relation to the respective sides of the rib, the movable jaw extending at one end fully to the bight portion in slidable engagement therewith and having an index marking at said one end thereof traversing said series on advancement of the movable jaw toward the fixed jaw; a removable connecting bolt extending between the legs parallel to the bight portion in closely spaced relation to the other ends of the rib and movable jaw; a hydraulic cylinder having a connection at one end to said other leg and extending in parallelism with the bight portion and bolt; and a ram sliding in the cylinder, the movable jaw being connected to said ram.

4. In a tool for re-arching the leaf spring of an automotive vehicle, a C-shaped fixed jaw including a bight portion and legs extending from and rigid with the bight portion at the respective ends of the bight portion, one of said legs being formed with a longitudinal, narrow, elongated rib of inverted-isosceles-triangular cross-section extending at one end fully to the intersection of said one leg with the bight portion, the bight portion having a longitudinal series of calibrations; a movable jaw having a shallowly V-shaped cross-section, said movable jaw being aligned with and opening toward the rib, said movable jaw being of a width greater than that of the rib and being symmetrically disposed with respect thereto so as to dispose the opposite side edges of the movable jaw laterally outwardly from and in equidistant relation to the respective sides of the rib, the movable jaw extending at one end fully to the bight portion in slidable engagement therewith and having an index marking at said one end thereof traversing said series on advancement of the movable jaw toward the fixed jaw; a removable connecting bolt extending between the legs parallel to the bight portion in closely spaced relation to the other ends of the rib and movable jaw; a hydraulic cylinder having a connection at one end to said other leg and extending in parallelism with the bight portion and bolt; and a ram sliding in the cylinder, the movable jaw being connected to said ram, the bight portion engaging the movable jaw against rotation about the cylinder axis from a position in which it is in alignment with the rib with its index marking disposed to traverse said series of calibrations.

References Cited in the file of this patent

UNITED STATES PATENTS

| Number | Name | Date |
|---|---|---|
| 487,958 | McCann | Dec. 13, 1892 |
| 995,595 | Hahn | June 20, 1911 |
| 1,208,092 | Carter | Dec. 12, 1916 |
| 1,712,799 | Jones | May 14, 1929 |
| 1,762,670 | Siesko | June 10, 1930 |
| 2,382,266 | Simonsen | Aug. 14, 1945 |
| 2,832,395 | Fisher | Apr. 29, 1958 |